United States Patent [19]

Hawkins et al.

[11] Patent Number: 4,887,098

[45] Date of Patent: Dec. 12, 1989

[54] THERMAL INK JET PRINTER HAVING PRINTHEAD TRANSDUCERS WITH MULTILEVELINTERCONNECTIONS

[75] Inventors: William G. Hawkins, Webster; Stephen F. Pond, Pittsford, both of N.Y.

[73] Assignee: Xerox Corporation, Stamford, Conn.

[21] Appl. No.: 275,991

[22] Filed: Nov. 25, 1988

[51] Int. Cl.⁴ ...................... G01D 15/16; G01D 15/10; H05B 15/10

[52] U.S. Cl. ........................... 346/140 R; 346/76 PH; 219/216

[58] Field of Search ...................... 346/140 R, 76 PH; 219/216; 400/126

[56] References Cited

U.S. PATENT DOCUMENTS 4,463,359 7/1984 Ayata et al. .................... 346/140 R
4,506,272 3/1985 Arai .
4,520,373 5/1985 Ayata .............................. 346/140 R
4,601,777 7/1986 Hawkins et al. ................ 346/140 R
4,602,261 7/1986 Matsuda et al. .
4,791,440 12/1988 Eldridge ........................ 346/140 R

FOREIGN PATENT DOCUMENTS 64864 3/1984 Japan .............................. 346/140 R
2154512 9/1985 United Kingdom ............ 346/140 R

*Primary Examiner*—Clifford C. Shaw
*Assistant Examiner*—Scott A. Rogers

[57] ABSTRACT

A thermal ink jet printer utilizes a printhead whose electrical connections to the heating elements used to expel the ink droplets has been modified to reduce the effects of parasitic resistance of the common return when a number of resistors are simultaneously addressed. The common return, formed in the same substrate level as the resistor elements, has been modified by forming and interconnecting a second common return. The resistor is connected to an input source by a low resistance connection which is formed to cross-over, or under, the second common.

11 Claims, 6 Drawing Sheets

THERMAL INK JET PRINTER HAVING PRINTHEAD TRANSDUCERS WITH MULTILEVELINTERCONNECTIONS

BACKGROUND OF THE INVENTION

This invention relates to thermal ink jet printing systems and, more particularly, to an improved printhead design incorporating several levels of interconnection for the resistive thermal energy generators.

Thermal ink jet printers are well known in the prior art as exemplified by U.S. Pat. Nos. 4,463,359 and 4,601,777. In the systems disclosed in these patents, a thermal printhead comprises one or more ink-filled channels communicating with a relatively small ink supply chamber at one end and having an opening at the opposite end, referred to as a nozzle. A plurality of resistors are located in the channels at a predetermined distance from the nozzle. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separating of the bulging ink as a droplet. The acceleration of the ink out of the nozzle while the bubble is growing provides the momentum and velocity of the droplet in a substantially straight line direction towards a recording medium, such as paper. In typical applications, ink droplets can be ejected at a rate of 5 kHz, giving rise to process speeds of up to 15 inches per second at 300 spots per inch printing resolution. To achieve practical print speeds, it is necessary to print with arrays of ≈20 or more nozzles which are constructed preferably, at the same ptich as pixels to be printed. Printers with small nozzle count use a scanning printhead and typically have print speeds of ≈1-page per minute (ppm). In order to print at speeds above ≈10 ppm, it is necessary to build a pagewidth print bar which typically contains several thousand jets. With process speeds of 15 inches per second, it is possible to print over 100 ppm with such architectures at 300 spi resolution. Therefore, to enable high through put thermal ink jet print engines, pagewidth print bars are essential.

The printhead design for the prior art systems described above place the thermal energy generators (resistors) on at least one wall of a small diameter capillary tube which contains the ink. The performance of the transducer depends strongly on the distance between the resistor and the nozzle. Drop size, drop velocity, and frequency of ink droplet ejection all depend on the distance between the resistor and the nozzle. Three hundred spi printing performance is optimized when the resistor begins about 120 μm behind the nozzle. The proximity of the resistors to the nozzle, coupled with the high packing density necessary for high density printing have the implication that electrical front lead connection to one end of the resistors must be made across the front of the resistor array. The short distance from the nozzle to the resistor requires the front lead to be narrower than 120 μm. For arrays of jets designed to operate up to a couple of ppm, the configuration where one end of the resistors is connected in common from both ends of the array is satisfactory. The problems with wider arrays, such as pagewidth, emerge because of the resistor energy requirement for printing, coupled with higher common lead resistance.

As mentioned previously, the thermal ink jet process uses rapid boiling of ink for drop ejection. Electrical heating pulses are applied for a few microseconds and must dissipate sufficient energy in the resister to raise it's surface temperature to about 300° C. in order for bubble nucleation to occur. Typical energies required for drop ejection are between 10 and 50 microjoules (μj), depending on the transducer structure and design. It is necessary to apply the energy within a short time, such as 5 μsec. Therefore, about 8 watts are being dissipated during the heating pulse. The current necessary for heating depends on the resistance value of the transducer. If a resistance value of 200 Ω is chosen, then 200 mA of current is required and the device operates at 40 V. It is desirable to use high operating voltages so that currents are lowered, but high voltage adversely effects resistor lifetime. Therefore, a moderate voltage such as 40 or 60 V is chosen.

Another requirement of the circuit used for thermal ink jet printing is imposed by the drop ejection frequency (≈5 kHz or 200 μsec) and the heating pulse length of ≈5 μsec. Only 40 jets can be fired over the 200 μsec time. Currently yield and process technology allow monolithic integration of up to ≈200 jets with good yield. Therefore, 4 or 5 jets must be simultaneously fired. The exact number fired during any particular time depends on the document data being printed. In order for the threshold for drop ejection to be the same when one jet or all jets are fired, the lead which connects the resistors to the power supply must have negligible resistance in comparison with the resistive elements. For the case just discussed, 4 simultaneously fired jets have a total resistance of 50 Ω. Two hundred jets at 300 spi is 0.666 inches, or 17,000 μm. The width of the metallization in front of the resistors is ≈100 μm, so there is 170 □ of metal. For typical commercial metal thickness (1.25 μm) and deposition techniques, aluminum has a sheet resistance of 0.032 Ω/□. Therefore, the common metal lead has an end to end resistance of 5.5 Ω. By connecting the metal on both ends, the resistance seen by the middle 4 resistors is 1.35 Ω, or 2.7% of the resistor resistance. From this example, it can be seen that as the number of jets within a module grows, more jets must be simultaneously fired and the parasitic resistance effect caused by the aluminum common connection increases. The practical upper limit before an alternative approach needs to be considered is a consequence of the overvoltage which will be applied when only one resistor element is fired, given that all elements need to fire if selected. Overvoltage increases power dissipation, shortens element lifetime, and causes drop nonuniformity. For the devices considered here, 4 to 6 simultaneously fired jets is the maximum which is practical.

In addition to the problem of the parasitic resistance effect, a second problem when using the aluminum common connection for wide arrays is the connection of the common between a plurality of chips which have been butted together to form the wide array. In order to butt together arrays of modules, each module must terminate so the spacing between it and its neighbors does not give rise to a noticeable and undesirable stitch error. It is well known that printing irregularities as small as 25 μm can be seen. Therefore, the modules must be within a few microns of their correct location. As an example, at 300 spi, 84.5 $\mu m$ is the pixel spacing. The thermal ink jet channel structure takes up about 65 um, leaving $\approx 20$ $\mu m$ for creation of a butted joint. The 20 $\mu m$ joint can not deviate more than $\pm 5$ $\mu m$ before perceptible image quality degradation occurs. There is insufficient space at the ends of the module to make a low resistance connection to the common power lead which runs along the front edge of the module. Even when single modules containing many resistors are fabricated and front common leads can be brought out at the ends of the array, it may be desirable to make additional interconnections to the common in order to avoid parasitic voltage drop when many elements are simultaneously fired.

According to the present invention, the common connection utilized in the prior art is modified by forming two commons and interconnecting them. By providing a second common, the first common located between the resistor and nozzle can be made relatively narrow enabling the resistor to be located at an optimum distance upstream of the nozzle without being restricted by the width of the unmodified wider common. The resistors are connected to the heating pulse source by a low resistance structure which crosses over, or under, the second common. In one embodiment the low-resistance cross-over structure is a heavily-doped polysilicon layer and the second common is aluminum. Other possible combinations include an n+diffusion in a p type wafer and aluminum; refactory metal silicides and aluminum. These embodiments have the effect of decreasing the parasitic resistance associated with the single common and provide additional space to make the interconnection between butted-together chips. More particularly, the invention is directed towards an ink jet printhead of the type having a plurality of channels, each channel being supplied with ink and having an opening which serves as an ink droplet ejecting nozzle a heating element being positioned in each channel, ink droplets being ejected from the nozzles by the selective application of current pulses to the heating elements in response to data signals from a data signal source, the heating elements transferring thermal energy to the ink causing the formation and collapse of temporary vapor bubbles that expel the ink droplets, said printhead further comprising a first and second electrically conductive common return, said common returns interconnected by leads extending between said heating elements, said heating elements connected between said first common return and said data signal source by a low resistance connection which is formed beneath or above said second common return.

IN THE DRAWINGS

FIG. 1 is a schematic perspective view of a prior art bubble jet ink printing system.

FIG. 2 is an enlarged schematic perspective view of the printhead shown in FIG. 1.

FIG. 3 is a top schematic view of an ink channel plate shown in FIG. 2.

FIG. 4 is a schematic side cross sectional view of a portion of the printhead of FIG. 3 showing the resistor to common width and spacing.

FIG. 5 is a top view of FIG. 4.

FIG. 6 is a side view of a plurality of printheads butted together to form a longer array.

FIG. 7 is a top view of a portion of a printhead modified, according to the invention, by forming a second common return interconnected to the primary common.

FIG. 8 is a side view of FIG. 7.

FIG. 9 is a top view of a second embodiment of the printhead.

FIG. 10 is a top view of a portion of a second embodiment of a printhead modified, according to the invention, by forming a second common return interconnected to the primary common.

DESCRIPTION OF THE DRAWINGS

The printers which make use of thermal ink jet transducers can contain either stationary paper and a moving print head or a stationary pagewidth printhead with moving paper. A prior art carriage type bubble jet ink printing device 10 is shown in FIG. 1. A linear array of droplet producing bubblejet channels is housed in the printing head 11 of reciprocating carriage assembly 29. Droplets 12 are propelled to the recording medium 13 which is stepped by stepper motor 16 a preselected distance in the direction of arrow 14 each time the printing head traverses in one direction across the recording medium in the direction of arrow 15. The recording medium, such as paper, is stored on supply roll 17 and stepped onto roll 18 by stepper motor 16 by means well known in the art.

The printing head 11 is fixedly mounted on support base 19 which is adapted for reciprocal movement by any well known means such as by two parallel guide rails 20 . The printing head base comprise the reciprocating carriage assembly 29 which is moved back and forth across the recording medium in a direction parallel thereto and perpendicular to the direction in which the recording medium is stepped. The reciprocal movement of the head is achieved by a cable 21 and a pair of rotatable pulleys 22, one of which is powered by a reversible motor 23.

Figure 1:
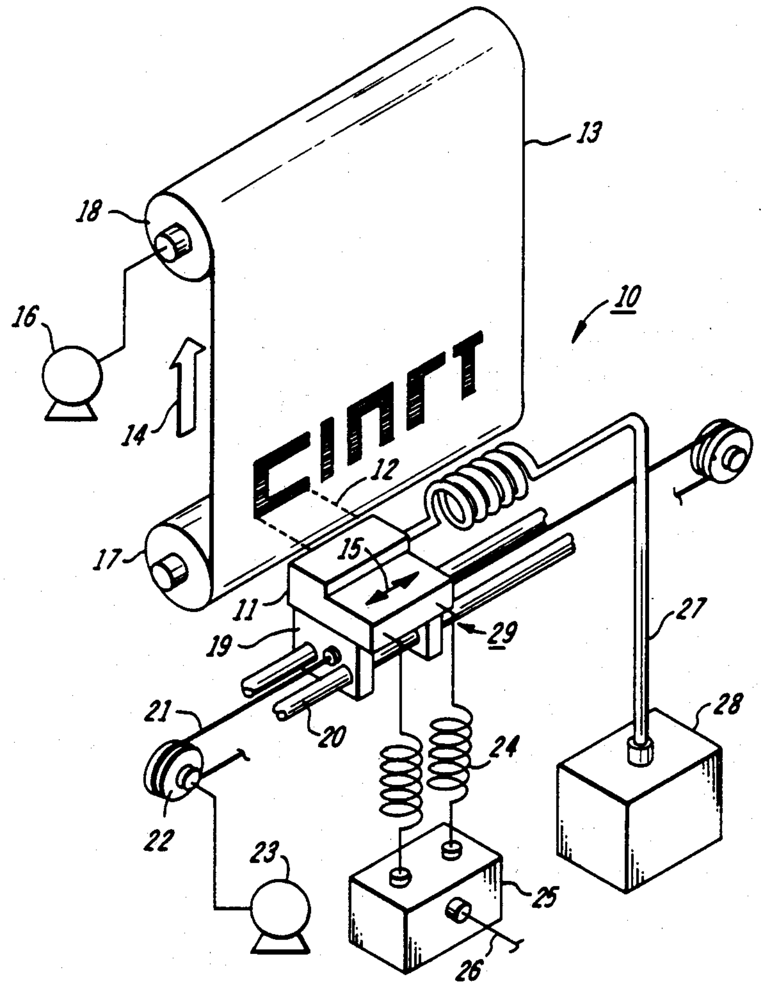
PRIOR ART FIG. 1

The current pulses are applied to the individual bubble generating resistors in each ink channel forming the array housed in the printing head 11 by connections 24 from a controller 25. The current pulses which produce the ink droplets are generated in response to digital data signals received by the controller through electrode 26. The ink channels are maintained full during operation via hose 27 from ink supply 28.

Figure 2:
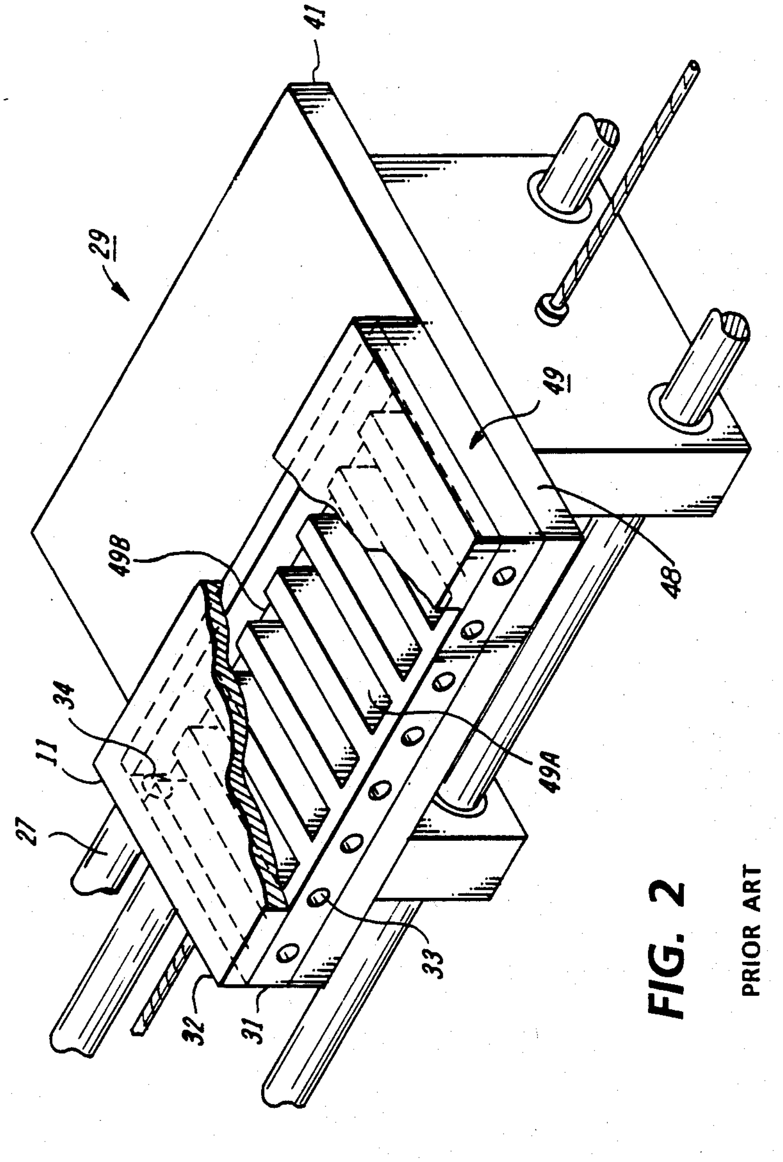
FIG. 2 PRIOR ART

FIG. 2 is an enlarged, partially sectioned, perspective schematic of the carriage assembly 29 shown in FIG. 1. The printing head 11 is shown in three parts. One part is the substrate 41 containing the electrical leads and monolithic silicon semi-conductor integrated circuit ship 48. The next two parts comprise the channel plate 49 having ink channels **49*a* and manifold 49*b*. Although the channel plate 49 is shown in two separate pieces 31 and 32, the channel plate could be an integral structure. The ink channels 49*a* and ink manifold 49*b* are formed in the channel plate piece 31 having nozzles 33 at the end of each ink channel opposite the end connecting the manifold 49*b*. The ink supply hose 27 is connected to the manifold 49*b* via a passageway 34 in channel plate piece 31 shown in dashed line. Channel plate piece 32 is a flat member to cover channel 49*a* and ink manifold 49*b*** as they are appropriately aligned and fixedly mounted on silicon substrate. Although only 8 channels and nozzles are shown for illustrative purposes, it is understood that many more channels and nozzles may be formed within a single printhead module.

Figure 3:
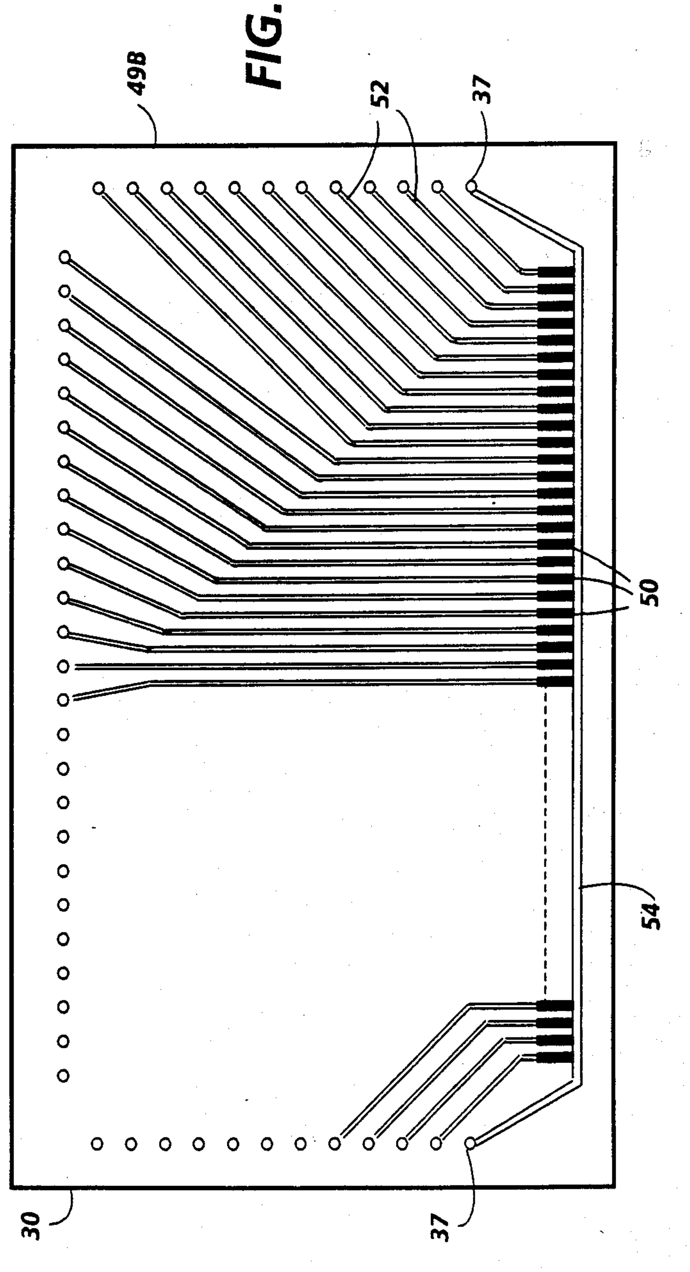
Figure 6:
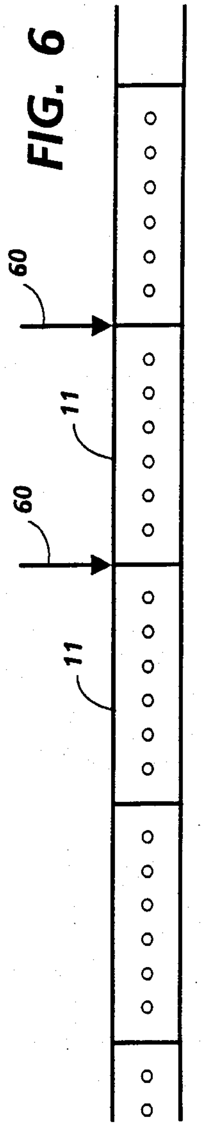
Figure 4:
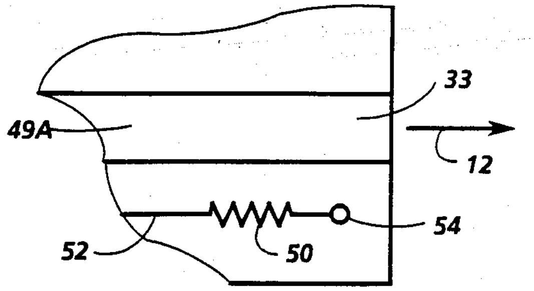
Figure 5:
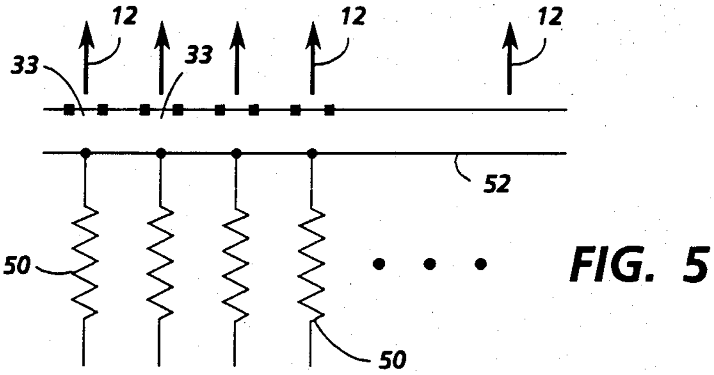

FIG. 3 is a top schematic view of heater plate **49*b* showing the electrical connection to the bubble generating resistors. As shown, each resistor 50 has an associated addressing electrode 52. Each resistor is further connected to a common return 54. The common return and the addressing electrode are aluminum leads deposited at the edge of the heating elements. The electrodes 52 can be replaced, if desired, by the drive transistors and logic control circuits disclosed in co-pending application U.S. Ser. No. 164,669 assigned to the same assignee as the present invention. FIG. 4 is a schematic cross sectional side view, and FIG. 5 a top view, respectively, of the printhead showing the position and spacing of the resistor vis-a-vis the common lead and the channel orifice. The resistors have a typical width of 45 μm and a distance from the resistor to the nozzle 33 of 120 μm is a typical value. The problems associated with the prior art configuration of FIGS. 1 to 3 can now more readily be appreciated. If the dimensions of the printhead are increased (in the printing direction), and additional jets added, the number of ink jets that must be simultaneously fired also increase. In order for the threshold for drop ejection to be the same when one jet or all jets are fired, the parasitic resistor effect of the aluminum common increases to the point at which drop nonuniformity is experienced. The prior art common interconnection also presents a problem when forming page width arrays by assembling arrays of printheads in a substantially colinear fashion. FIG. 6 shows an edge view of a plurality of printheads 11 assembled together. (A preferred technique for accomplishing the assembly is described in U.S. Ser. No. 185,600 filed on Apr. 25, 1986 and assigned to the same assignee as the present invention). A problem to be addressed with this configuration is that there is not enough space at joints 60** to make the low resistance connections from each printhead to the common.

Figure 7:
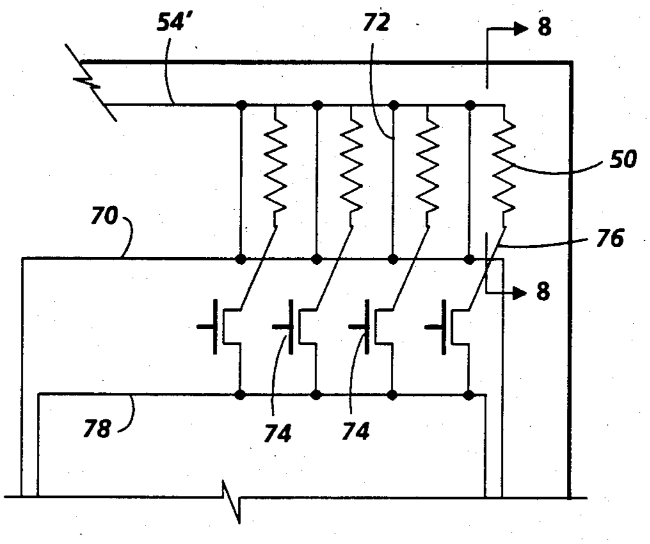

According to a first aspect of the present invention, the common lead is modified by providing a second common lead and by interconnecting the thermal, energy generating resistors to the power source by a low resistance connection. FIG. 7 shows a top view, of a printhead with these modifications. The parasitic resistance of the prior art common connection has been decreased by at least 25% with this embodiment with the formation of a second common lead 70. Second common 70 is connected to the first common 54' which, in a preferred embodiment, has been modified by reducing its width. Common lead 70 is connected to common 54' by leads 72 alternating between each resistor 50. The resistance of the second common depends upon the specific application. Resistors 50 are connected to transistor switches 74 by a low resistance connector 76. Common 70 passes over, or under, and is insulated from, connector 76. The table below shows combinations of materials which can be used for interconnections 76 and for the secondary common 70. Connection 78 is the ground return bus and is also preferably formed from aluminum. Transistor switches 74 can be an MOS type formed by monolithic intregation onto the same silicon substrate containing the resistor. A preferred process for forming the switches is described in copending application Ser. No. 164,669, assigned to the same assignee as the present invention, and whose contents are hereby incorporated by reference. The connector 76, if utilizing structure 1 or 2, has sheet resistance in the 30–10 Ω/□ size range, which may satisfy requirements for systems with relatively small power dissipation. For applications where it is desirable to fire many jets, or to use resistors with a relatively large power dissipation, the sheet resistance can be lowered further by the use of refractory metal silicide/silicon or metal silicide/-polysilicon stacks. (structures 3–4) While the preferred embodiment is aluminum, other highlyconductive layers such as tungsten may also be used.

TABLE

| STRUCTURE NO. | LOW RESISTANCE CONNECTOR 76 | CONDUCTORS 54' AND 70 |
|---|---|---|
| 1 | n + diffusion in p type wafer | aluminum |
| 2 | heavily doped polysilicon | aluminum |
| 3 | metal silicide | aluminum |
| 4 | silicide/polysilicon | aluminum |
| 5 | aluminum | aluminum |
| 6 | tungsten | aluminum |

Figure 8:
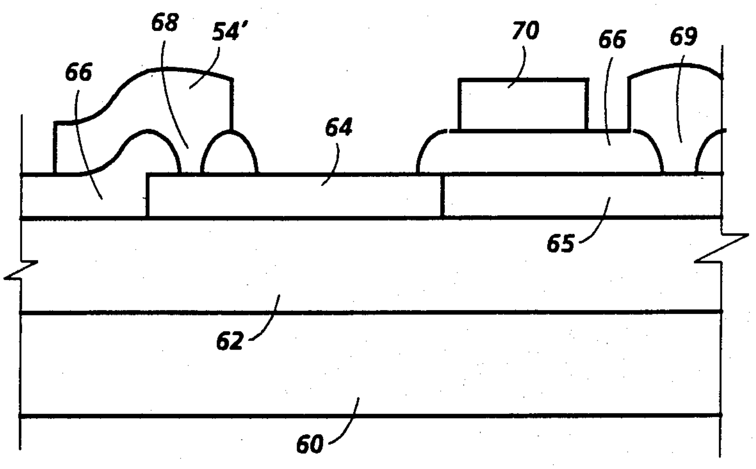

FIG. 8 shows a side cross-sectional view A—A of FIG. 7. A silicon substrate wafer 60 is processed by the LOCOS (local oxidation of silicon) process to form a thick isolation oxide layer 62. An n+ polysilicon layer 64 is deposited, doped and patterned to form the resistors 50; an n++ polysilicon layer 65 is formed at the same level to form the low resistance (30 ohm/square) connection 76 to the addressing electrode leads. Phosphorous doped glass is then deposited to form insulating layer 66. Photoresist is applied in pattern to form vias 68, 69 to the resistors 64, and connecting lead 65. The wafer is then metallized and aluminum patterned to form aluminum commons 54' and 70. Commons 54' and 70 are preferably in range of 100–300 microns thickness.

Figure 9:
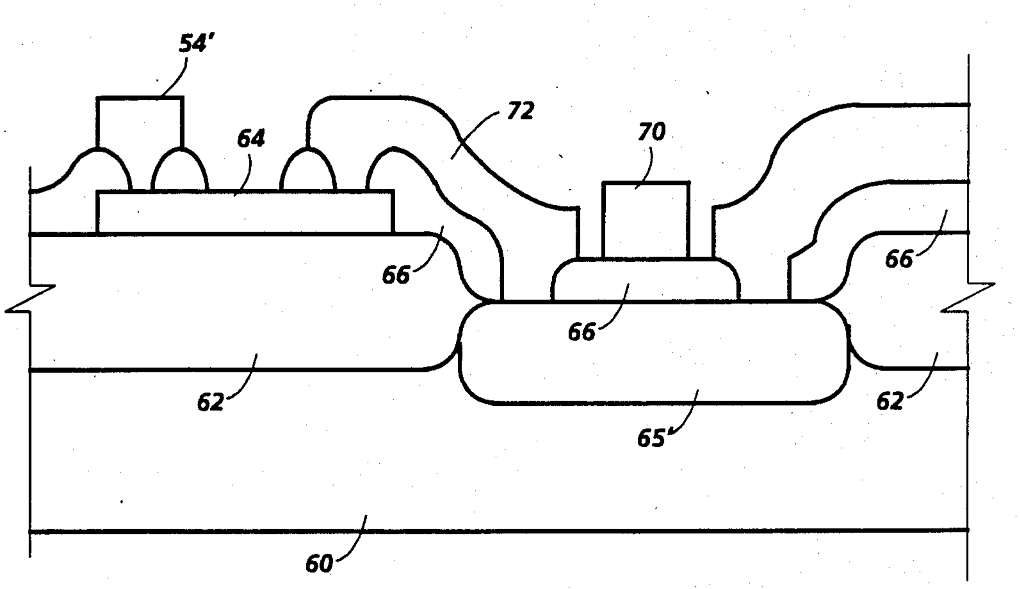

FIG. 9 shows a second embodiment of the invention wherein the second level connector 65' is an n+ diffused silicon layer (structure 1). Layer 65' can be connected to the resistor by aluminum lead 72 or by a direct butting contact between the resistor 64 and diffusion 65'. Referring again to the table, structures 3 and 4 have a similar cross section to 1 and 2, but the resistance of connection 76 is further lowered by formation of a metal silicide with sheet resistance of approximately 1 Ω/□.

Figure 10:
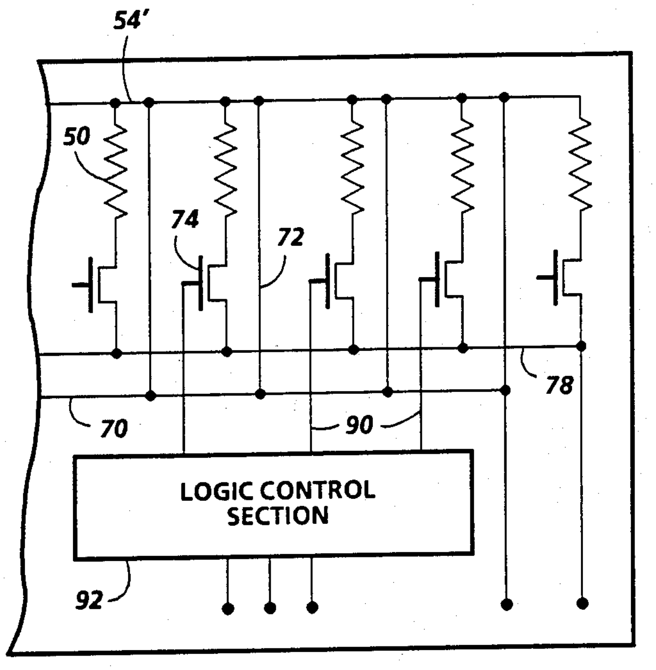

FIG. 10 shows a top view for an alternative cross-over arrangement to that of the FIG. 7 embodiment. For this case, the ground return connection 78 is formed between the transistor switches 74 and the second common 70. A connection 90 is now made between transistor gate 74 and a logic control circuit 92. The gate connection 90 drives only a capacitive driver gate load and therefore can be constructed of polysilicon or diffusion because circuit performance is not impacted by the modest impedance of 10's to 100 squares of sheet resistance exhibited by these layers. For this case, connector 72 crosses over (or under) return connection 78 and attaches to common 70. The same methods of construction discussed for component 76 (FIG. 7) can be applied to component 72.

While the invention has been described with reference to the structures disclosed, it is not confined to the specific details set forth but is intended to cover such modifications or changes as may come within the scope of the following claims. For example, although the preferred embodiments show the low resistance connection crossing under the common, some systems may use a cross-over fabrication with the common being buried and the low resistance connector formed in overlying configuration.

We claim:

1. An ink jet printhead of the type having a plurality of channels, each channel being supplied with ink and having an opening which serves as an ink droplet ejecting nozzle a heating element being positioned in each channel, ink droplets being ejected from the nozzles by the selective application of current pulses to the heating elements in response to data signals from a data signal source, the heating elements transferring thermal energy to the ink causing the formation and collapse of temporary vapor bubbles that expel the ink droplets, said printhead further comprising a first and second electrically conductive common return, said common returns interconnected by leads extending between said heating elements, said heating elements connected between said first common return and said data signal source by a low resistance connection which is formed beneath or above said second common return.

2. The ink jet printhead of claim 1 wherein said first and second common returns are aluminum and said low resistance connection is an n+ diffusion in a p-type silicon wafer.

3. The ink jet printhead of claim 1 wherein said first and second common returns are aluminum and said low resistance connection is heavily doped polysilicon on a field oxide.

4. The ink jet printhead of claim 1 wherein said first and second common returns are aluminum and said low resistance connection is metal silicide formed on n+ or p silicon.

5. The ink jet printhead of claim 1 wherein said first and second common returns are aluminum and said low resistance connection is a silicide/polysilicon stack.

6. The ink jet printhead of claim 1 wherein said first and second common returns are aluminum and said low resistance connection, is aluminum.

7. The thermal ink jet printhead of claim 1 further including a plurality of printheads assembled substantially colinearly, the heating elements of each printhead connected to the first common and the second commons being interconnected, said second common terminating toward the rear of the printhead so as to enable routing of power to the heating elements.

8. The thermal ink jet printhead of claim 1 wherein said first common has a width in the range of 25 to 300 microns.

9. The thermal ink jet printhead of claim 1 wherein said low resistance connection is formed above said second common return.

10. The thermal ink jet printhead of claim 1 further including a transistor switch connected between the resistor and the signal source, said low resistance connection formed between the resistor and the transistor switch.

11. The thermal ink jet printhead of claim 10 wherein said low resistance connection is formed between said transistor switch and said signal source.

* * * * *